US 6,958,845 B2

(12) United States Patent
Hiironen et al.

(10) Patent No.: US 6,958,845 B2
(45) Date of Patent: Oct. 25, 2005

(54) OPTICAL CONTROL ELEMENT

(75) Inventors: Olli-Pekka Hiironen, Espoo (FI); Harri Järvinen, Vantaa (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/481,897

(22) PCT Filed: Jun. 18, 2002

(86) PCT No.: PCT/FI02/00533

§ 371 (c)(1),
(2), (4) Date: Dec. 23, 2003

(87) PCT Pub. No.: WO03/003103

PCT Pub. Date: Jan. 9, 2003

(65) Prior Publication Data

US 2004/0190107 A1    Sep. 30, 2004

(30) Foreign Application Priority Data

Jun. 29, 2001    (FI)    ................................. 20011414

(51) Int. Cl.⁷ .......................... G02F 1/09; G02F 1/035
(52) U.S. Cl. ......................................... 359/281; 385/2
(58) Field of Search ............................... 359/246, 251, 359/281, 301, 484, 488, 495; 385/1–3, 12, 385/36; 250/227.11

(56) References Cited

U.S. PATENT DOCUMENTS

| 4,938,554 | A | * | 7/1990 | Wilson et al. ................. 385/16 |
| 5,162,940 | A | * | 11/1992 | Brandelik .................... 359/333 |
| 5,923,472 | A | | 7/1999 | Bergmann .................... 359/618 |
| 6,018,411 | A | | 1/2000 | Fukushima et al. .......... 359/283 |
| 6,154,581 | A | | 11/2000 | Lu et al. ........................ 385/11 |
| 6,795,245 | B2 | * | 9/2004 | Xiao ........................... 359/495 |

FOREIGN PATENT DOCUMENTS

| EP | 0874263 A1 | 10/1998 |
| EP | 1065551 A2 | 1/2001 |

* cited by examiner

Primary Examiner—Georgia Epps
Assistant Examiner—William Choi
(74) Attorney, Agent, or Firm—Harrington & Smith, LLP

(57) ABSTRACT

An optical control modulator comprises an input to receive light from a light source; a polarization divider to divide the light into two orthogonal plane-polarized light components; a Faraday material which, upon being energized, rotates the plane of polarization of the plane-polarized light as it passes through the material; and an output. The light travels through the Faraday material in opposite directions on a common path. In one embodiment, the light passes once through the Faraday material on a loop path. In another embodiment, the light passes twice through the Faraday material by being reflected by a mirror disposed at a back face of the Faraday material.

22 Claims, 5 Drawing Sheets

OPTICAL CONTROL ELEMENT

FIELD OF THE INVENTION

The invention relates to an optical control element. It is particularly, but not exclusively, related to an optical control element, such as an optical switch or an optical modulator.

BACKGROUND OF THE INVENTION

In order to provide broadband telecommunications, optical transmission systems have been developed. Typically such systems transmit optical signals along optical fibre in the wavelength range of 1300 to 1550 nm. In order to provide multiple access for a plurality of users, it has been proposed for optical transmission systems to use wavelength division multiple access (WDMA).

SUMMARY OF THE INVENTION

An optical transmission system 110 is shown in FIG. 1. The system 110 comprises a central office (CO) or hub 112 connected to groups of users or optical network units (ONUs) 114. In this embodiment only one group 116 is shown although it will be understood that there would be a plurality of such groups. The hub 112 is connected by a common optical fibre 118 to a wavelength division multiplexer (WDM) 120. The users 1 14 are connected separately to the WDM 120 by respective optical fibres 122.

Communication in the system occurs across a wavelength range, typically 1530 to 1565 nm. Each user is assigned a wavelength band, typically 0.8 nm, with which to communicate. The hub 112 is equipped with individual laser sources producing light at different wavelengths suitable for different users. Therefore, in transmitting to individuals of the users 114, data is modulated onto appropriate light wavelengths which are then transmitted down the common optical fibre 118 to the WDM 120. The WDM 120 separates the light according to wavelength and then directs particular wavelengths to particular users 114.

Since it is impractical to provide every user 114 with a laser source operating within its assigned wavelength band, two arrangements have been proposed. In the first arrangement, spectral slicing is used, in which each user 114 has a broadband light source, from which a specific optical wavelength band is sliced and then used in the network. For bit rates of up to 500 Mbit/s modulation is effected by switching the broadband light source on and off. For higher bit rates, an external modulator may be used. In the second arrangement, a laser at the hub 112 transmits continuous wave (CW) light at appropriate wavelengths for each of the users 114. Modulators located at the users 114 modulate data onto this CW light and send it to the WDM 120 on the respective optical fibres 122. It has been proposed to use loopback based modulators (IEEE Photonics Technology Letters, November 1994, volume 6, number 11, pages 1365 to 1367) or mirror based modulators (disclosed in IEEE Photonics Technology Letters, September 1996, volume 8, number 9, pages 1175 to 1177). Different wavelengths of light from different users 114 are multiplexed together by the WDM 120 and transmitted together on the common optical fibre 118 to the hub 112. Such a system is disclosed in IEEE Photonics Technology Letters, November 1994, volume 6, number 11, pages 1365 to 1367.

Intensity modulation is the most common modulation method used in optical transmission systems. Typically data is modulated onto the light by turning a laser on and off. Alternatively, external modulation may be provided, for example by electro-absorption devices, Mach-Zehnder interferometer modulators, mechanical based modulators or polarisation modulators. Polarisation modulators to achieve intensity modulation by using a Pockels cell are disclosed in Fundamentals of Photonics, B. E. A. Saleh, pages 703 to 705 and in Lasers & Applications, R. Goldstein, April 1986, volume 5, number 4, pages 67 to 73.

Optical modulators are known which use the Faraday effect. This causes the rotation of the plane of polarisation of plane-polarised radiation to be rotated as the radiation passes through an isotropic medium in the direction of a magnetic field in which the medium is placed. The angle of the rotation is proportional to the strength of the magnetic field. Examples of media or Faraday rotators exhibiting the Faraday effect (Faraday materials) are Yttrium-iron-garnet and Terbium-gallium-garnet.

U.S. Pat. No. 4,789,500 discloses an arrangement using the Faraday effect to provide an optical isolator. This arrangement has a polariser, a Faraday material surrounded by a coil and a mirror. A voltage is applied to the coil to cause current flow so that the coil generates a magnetic field which extends into the Faraday material. Light passing through the polariser becomes plane-polarised and its plane of polarisation is rotated as it passes through the Faraday material. The plane-polarised light leaves the Faraday material and is then reflected by the mirror on a return journey. On its return journey, as the plane-polarised light passes through the Faraday material, its plane of polarisation is rotated further. Consequently, the plane-polarised light is stopped by the polariser.

One problem in optical communications systems is back reflection. Connectors and other optical components present in an optical fibre transmission path reflect light from discontinuities such as their end faces. Back reflection can have a destabilising effect on oscillation of laser sources and on the operation of optical fibre amplifiers, thus resulting in a poor transmission performance. For this reason, optical isolators are used to reduce back reflection.

A polarisation-independent optical isolator which uses the Faraday effect is disclosed in IEEE Photonics Technology Letters, March 1989, volume 1, number 3, pages 68 to 70. The isolator comprises, in series, in a forward direction in which light is able to pass, a first birefringent crystal element, a 45° Faraday rotator, a second birefringent crystal element and a third birefringent crystal element. A lens is placed at each end of the isolator to provide coupling with upstream and downstream optical fibres. Forward-travelling light entering the optical isolator is separated into ordinary and extraordinary rays by the first birefringent crystal element. By taking advantage of the spatial walk-off experienced by the ordinary and extraordinary rays, and the reciprocal and non-reciprocal natures of the birefringent crystal elements and the Faraday rotator respectively, the forward-travelling light is coupled into the downstream optical fibre whilst ordinary and extraordinary rays of backward-travelling light are spatially separated from the axis of propagation of the forward travel light and so are not coupled into the upstream optical fibre.

Polarisation-independent isolators are frequently used in optical fibre amplifiers.

According to a first aspect of the invention there is provided an optical control element having an input to receive light from a light source, a polarisation divider to convert the light into plane-polarised light, a material which upon being energised rotates the plane of polarisation of the plane-polarised light as it passes through the material and an output wherein the light travels through the material in opposite directions on a common path.

In the invention the intensity of the light may be modulated by changing its polarisation state. In one embodiment, the light is divided into two components having different respective polarisation states. The polarisation states of each of the light components may then be changed. Thus by changing the polarisation state of the light components prior to them entering the polarisation divider, the output from the polarisation divider can be intensity modulated.

Preferably the optical control element comprises a polarisation combiner. Advantageously, the polarisation divider and the polarisation combiner are the same element.

In one embodiment the light passes once through the material. In this embodiment, the light may be split into a first part and a second part wherein the first part travels on the common path in a first direction and the second part travels on the common path in a second opposite direction.

In another embodiment, the light passes a first time and then a second time through the material. In this embodiment, the light first travels on the common path in a first direction and then travels on the common path in a second opposite direction. Preferably there are two common paths. In this case, the light may be split into a first part and a second part wherein the first part travels on a first common path firstly in a first direction and then secondly in a second opposite direction and the second part travels on a second common path firstly in a first direction and then secondly in a second opposite direction.

Preferably the optical control element comprises a reflecting element such as a mirror. The reflecting element may be used to reflect incident light back along the common path from which it came. Preferably, the light travels on the common path from the input to the reflecting element and then travels back on the common path from the reflecting element to the polarisation divider. Whether it is output by the output is determined by whether the material is energised.

Preferably the input and the output commonly comprise an input/output.

Preferably the material is energised when subjected to a magnetic field. The material may be a magneto-optical material such as a Faraday material. Alternatively, the material is energised when subjected to an electric field. The material may be an electro-optical material such as $NH_4H_2PO_4$, $KH_2PO_4$, $LiNbO_3$, $LiTaO_3$, and CdTe.

Preferably the optical control element comprises a magnetic field generator for applying a magnetic field to the material. In one embodiment, the magnetic field generator is a coil and a power supply for causing current flow in the coil. Preferably the material is located inside the coil.

Preferably the optical control element comprises an electrical field generator for applying an electrical field to the material. In one embodiment, the electrical field generator is a pair of plates and a power supply for applying an electrical field across the plates. Preferably the material is located between the plates.

Preferably the optical control element comprises a modulation control unit for controlling the power supply. The modulation control unit may modulate the power supply so as to modulate the amount of current flowing in the coil and thus the magnetic field that it generates. Alternatively, the modulation control unit may modulate the power supply so as to modulate the amount of electrical field generated across the plates.

Preferably the polarisation divider has a single input to receive light which is not plane-polarised and two outputs to output first and second light components orthogonally polarised with respect to each other. Preferably, the polarisation divider has two inputs to receive two beams of light which are orthogonally polarised with respect to each other and a single output. Preferably, the polarisation divider comprises an outward path and a return path in which the light passes through the polarisation divider on the outward path, passes through the material and then travels back through the polarisation divider on the return path.

Preferably the optical control element is a modulator. It may be used to provide a digital signal. Alternatively, it may be used to provide an analogue signal.

According to a second aspect of the invention there is provided a method of modulating light comprising the steps of:
  receiving light from a light source;
  using a polarisation divider to convert the light into plane-polarised light;
  sending the light in opposite directions on a common path; and
  rotating the plane of polarisation of the plane-polarised light as it travels on the common path.

According to a third aspect of the invention there is provided an optical network unit for an optical transmission system comprising an optical control element, wherein the optical control element comprises an input to receive light from a light source, a polarisation divider to convert the light into plane-polarised light, a material which upon being energised rotates the plane of polarisation of the plane-polarised light as it passes through the material and an output wherein the light travels through the material in opposite directions on a common path.

According to a fourth aspect of the invention there is provided an optical transmission system comprising at least one optical control element, wherein the or each optical control element comprises an input to receive light from a light source, a polarisation divider to convert the light into plane-polarised light, a material which upon being energised rotates the plane of polarisation of the plane-polarised light as it passes through the material and an output wherein the light travels through the material in opposite directions on a common path.

BRIEF DESCRIPTION OF THE DRAWINGS

The invention will now be described by way of example only with reference to the accompanying drawings in which.

DETAILED DESCRIPTION OF THE INVENTION

Figure 1:
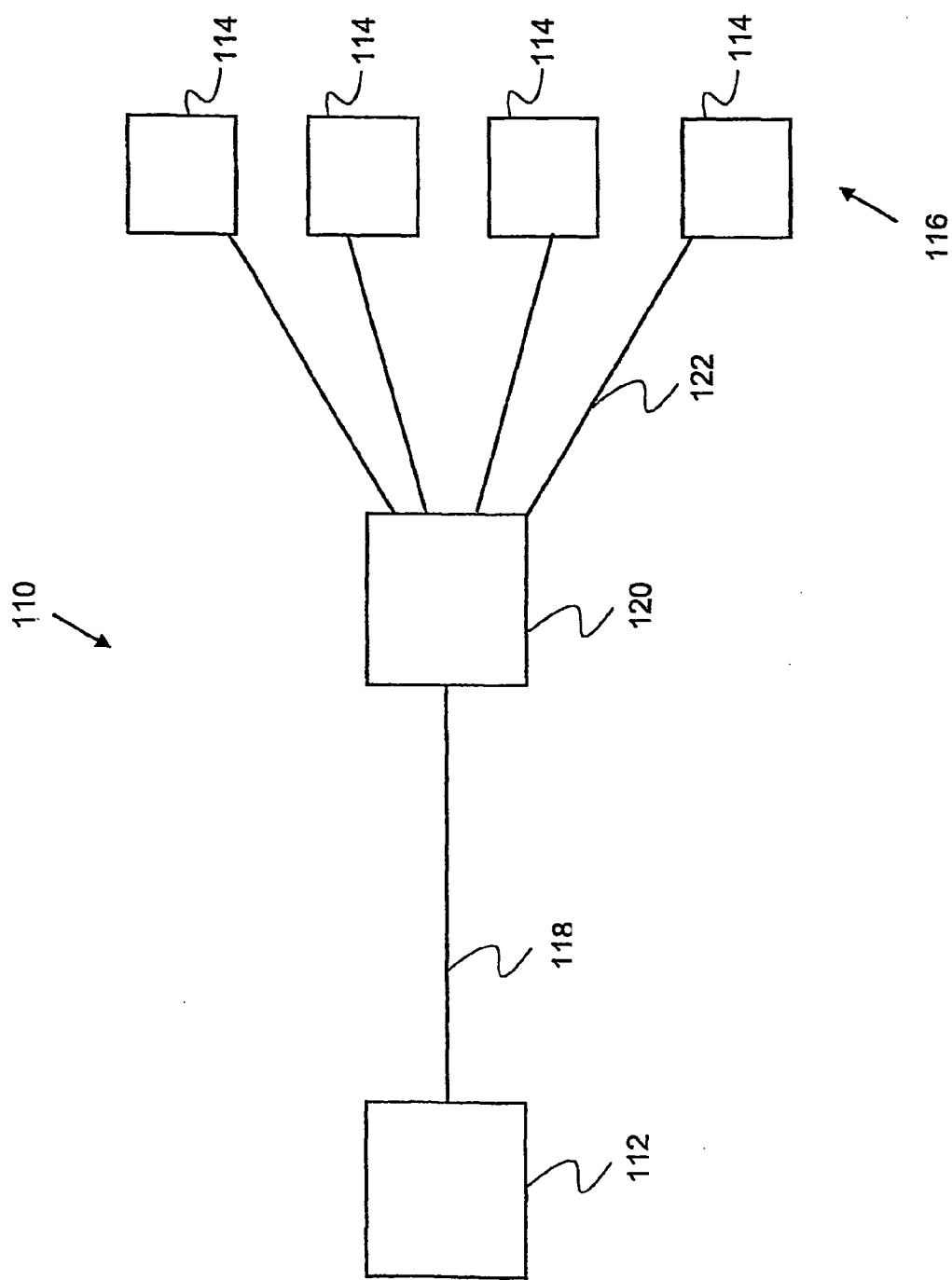
FIG. 1 shows a WDMA system.

The invention is applicable in an optical WDMA communications system such as that described in relation to FIG. 1. As mentioned above each user 114 has a broadband light source which is spectrally sliced to provide a specific optical wavelength band or each user 114 receives CW light transmitted from the hub 112. Digital modulators which are used at the users 114 to modulate data onto this CW light will now be described.

Figure 2:
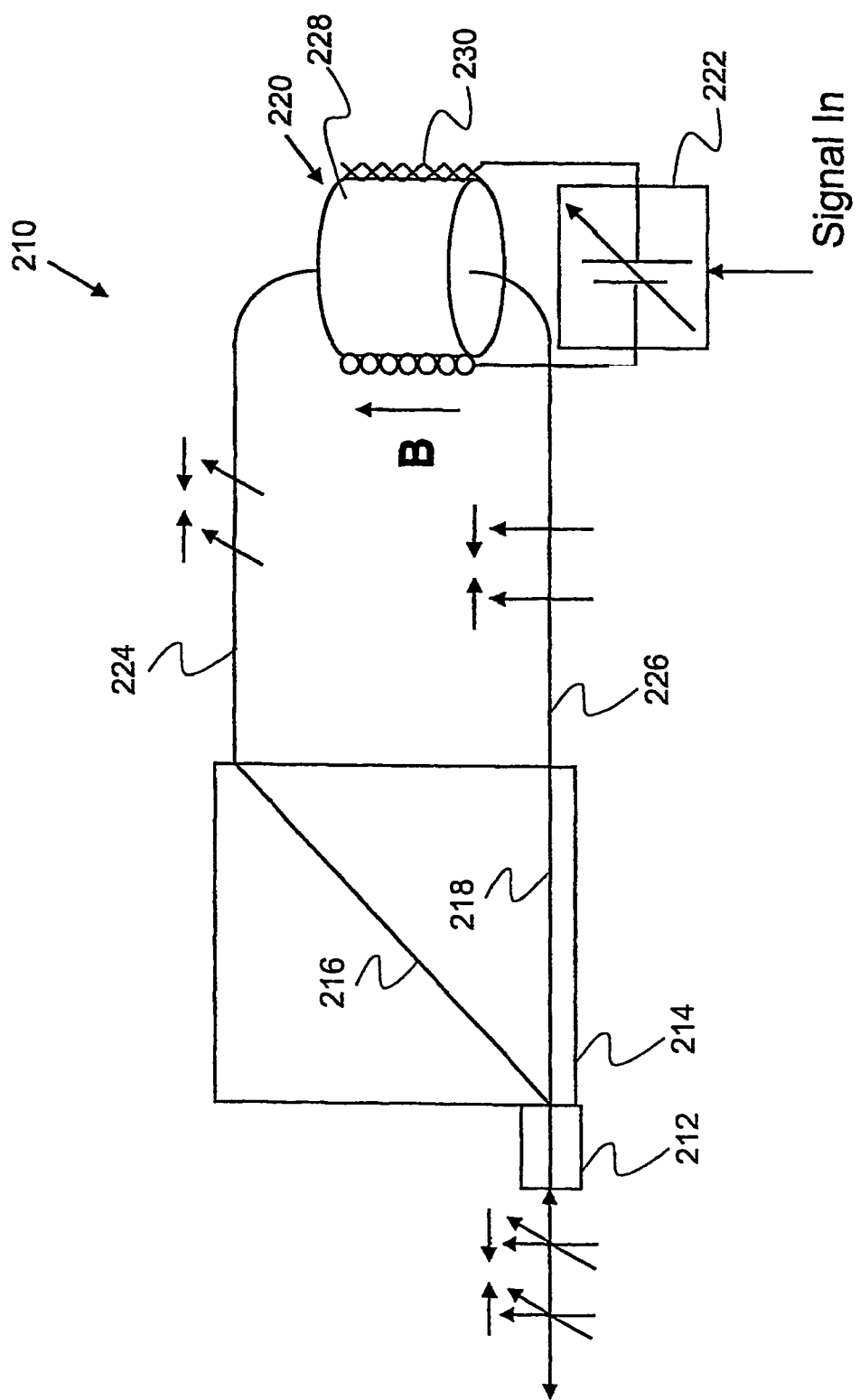
FIG. 2 shows a modulator.

FIG. 2 shows a modulator 210 according to the invention. This will be referred to in the following as the "loop embodiment". The modulator comprises an input/output 212, a polarisation divider (otherwise known as a polarisation splitter) 214 having a first light path 216 and a second light path 218 and a Faraday rotator 220 driven by a modulating power source 222. The polarisation divider 214 is coupled to the Faraday rotator 220 by coupling paths 224 and 226. The Faraday rotator 220 comprises a Faraday material 228 surrounded by a coil 230. Ends of the coil are connected to the modulating power source 222.

The polarisation divider 214 may be an integrated device such as that described in Journal of Lightwave Technology, November 1993, volume 11, number 11, pages 1806 to 1811.

Figure 3A:
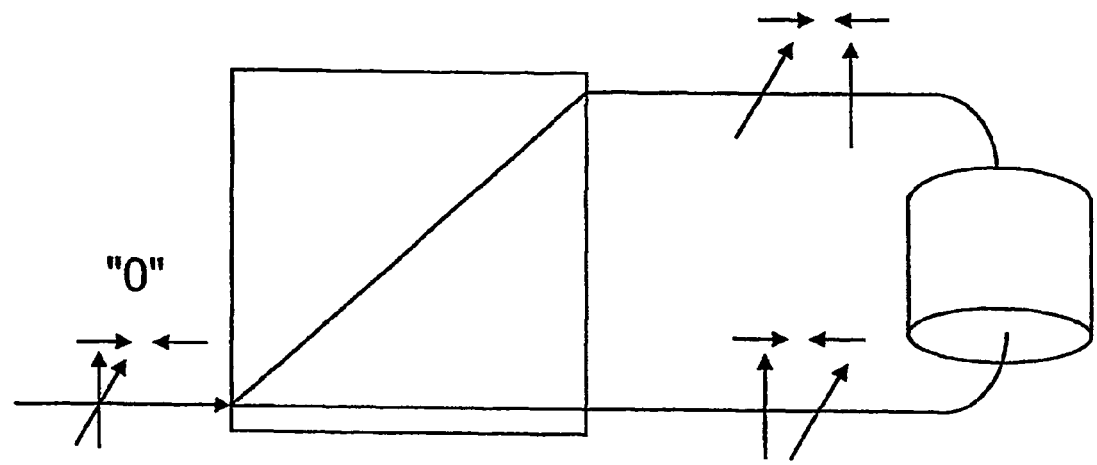
FIGS. 3a and 3b show operational states of the modulator of FIG. 2.
Figure 3B:
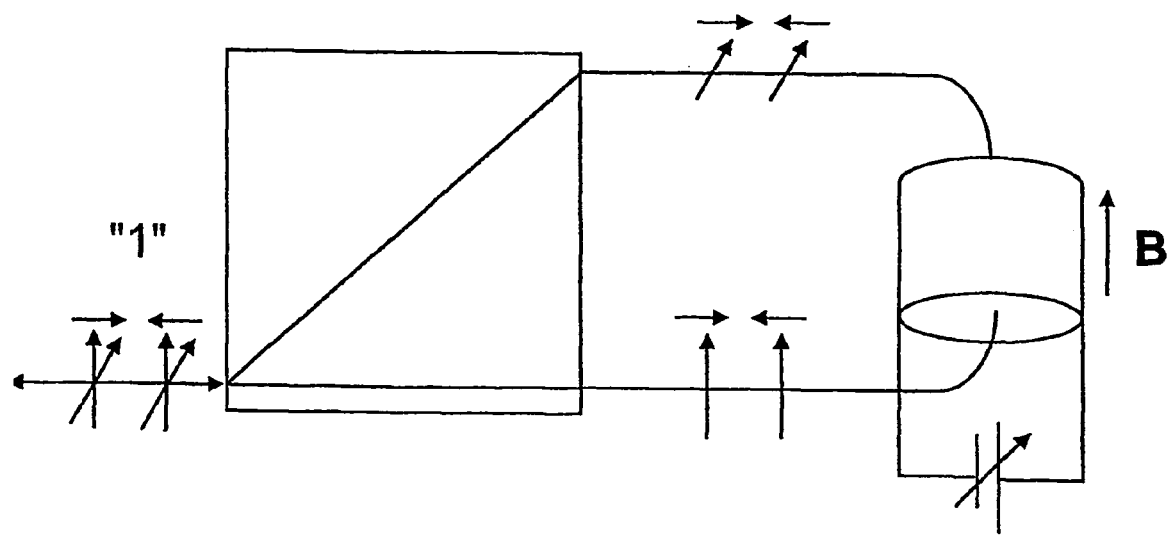

FIGS. 3a and 3b show operational states of the modulator 210 of FIG. 2. In both of these states, CW light is supplied by a laser located at the hub 112 and enters the modulator 210. The light enters the input/output 212 and is divided according to its polarisation by the polarisation divider 214. Light of one polarisation travels along the light path 216 and light of an orthogonal polarisation travels along the light path 218. The two light components enter the coupling paths 224 and 226 and then pass through the Faraday material 228 in opposite directions. The state of the light produced by the modulator 210 depends on whether the Faraday material is energised by the coil 230 as will now be described.

Referring now to FIG. 3a, if the modulating power source 222 is not applying a driving current to the coil, no magnetic field is produced and no Faraday rotation is applied to the light passing through the Faraday material 228. In this case, the light components return to the polarisation divider and attempt to travel along light paths 216 and 218 which each previously allowed the transmission of a light component having an orthogonal polarisation with respect to the returned light components. In this case, the light components cannot travel along the light paths and thus the light components are either stopped or are refracted away from the input/output so that they are not output by the modulator 210. Therefore, no (or at least very little) light is produced by the modulator 210 and thus a "0" signal is produced.

Referring now to FIG. 3b, the modulating power source 222 is applying a driving current to the coil 230 and a magnetic flux density B is generated which extends into the Faraday material 228. Accordingly, the light components have their planes of polarisation rotated as they pass through the Faraday material 228. It is arranged so that the length of the Faraday material, its Verdet constant, V, that is its rotation power per unit length per magnetic flux density, and the magnetic flux density B are such that the planes of polarisation of the light components each undergo a rotation of 90° as they pass through the Faraday material 228. In this case the light components leaving the Faraday material 228 return to the polarisation divider having planes of polarisation which are appropriate to allow them to travel along light paths 216 and 218. Therefore, the light components are able to travel along the light paths 216 and 218 and are thus recombined at the input/output 212 so that they are output by the modulator 210. In this case, the modulator 210 produces a "1" signal.

Of course, the modulator can be arranged so that it produces a "0" signal when there is power from the modulating power source 222, and a "1" signal when there is no power from the modulating power source 222.

Figure 4:
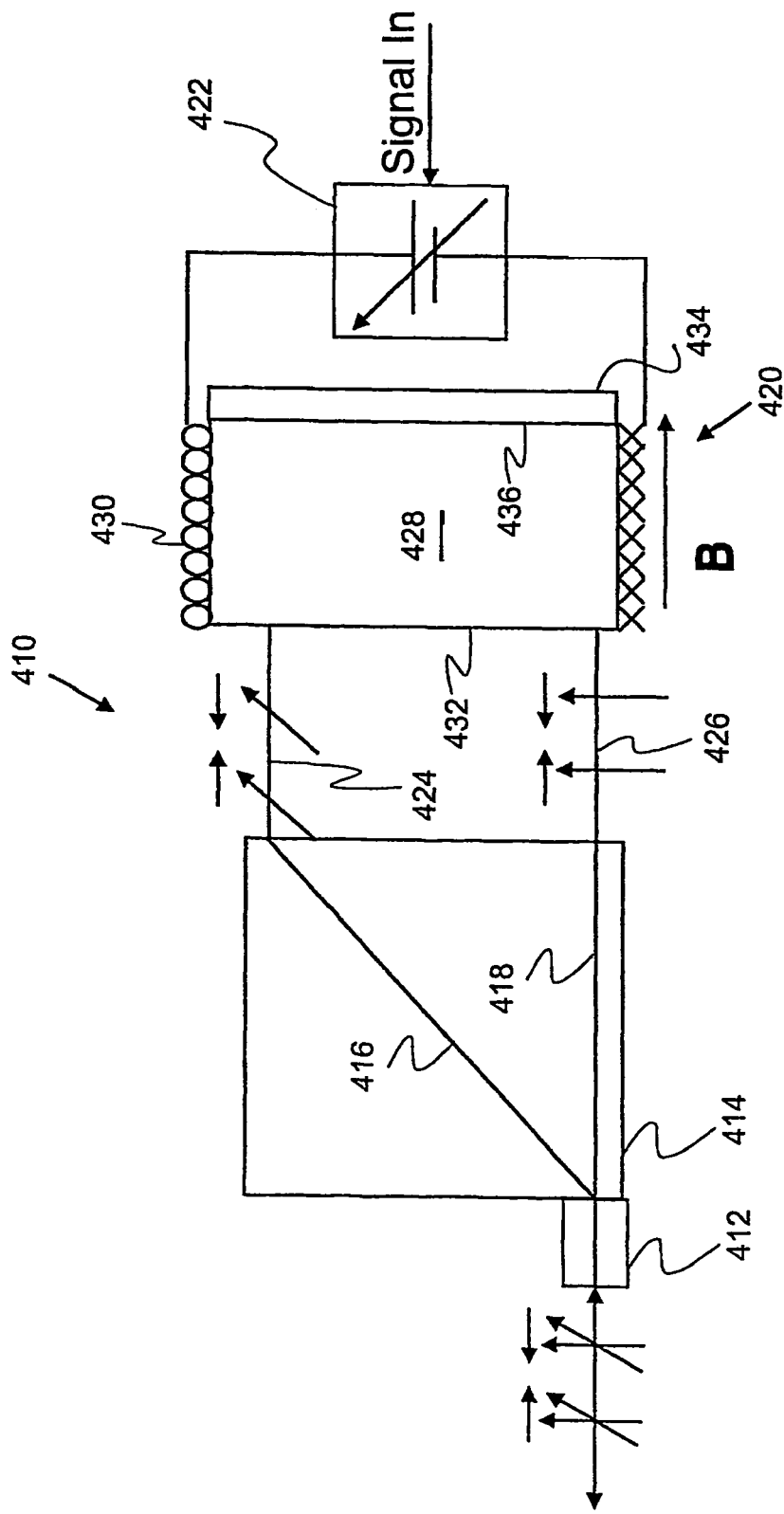
FIG. 4 shows an alternative embodiment of a modulator.

FIG. 4 shows a modulator 410 according to the invention. This will be referred to in the following as the "mirror embodiment". The modulator comprises an input/output 412, a polarisation divider 414 having a first light path 416 and a second light path 418 and a Faraday rotator 420 driven by a modulating power source 422. The polarisation divider 414 is coupled to the Faraday rotator 420 by coupling paths 424 and 426. The Faraday rotator 420 comprises a Faraday material 428 surrounded by a coil 430. Ends of the coil are connected to the modulating power source 422.

Figure 5B:
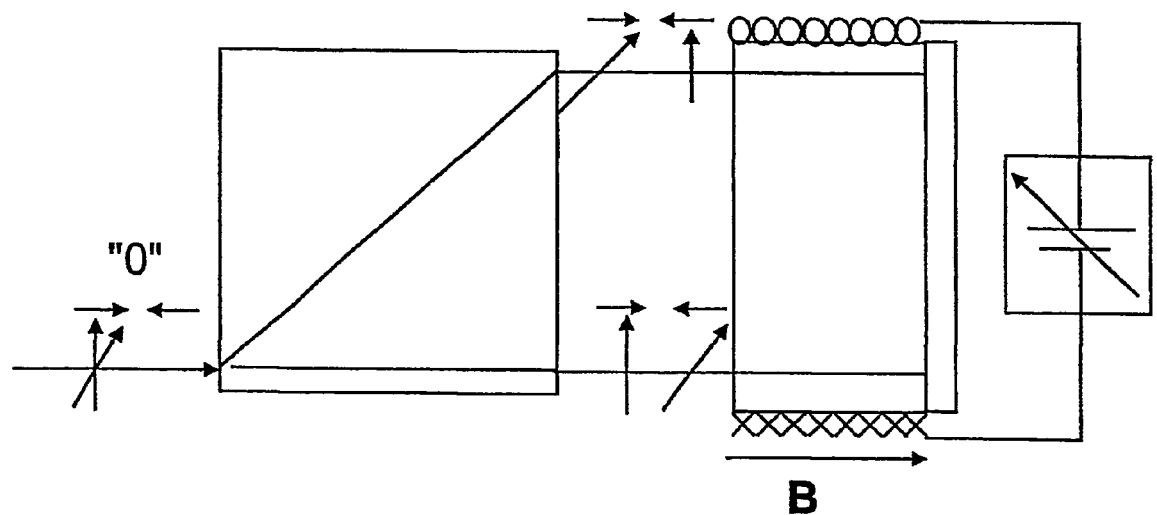
FIGS. 5a and 5b show operational states of the modulator of FIG. 4.
Figure 5A:
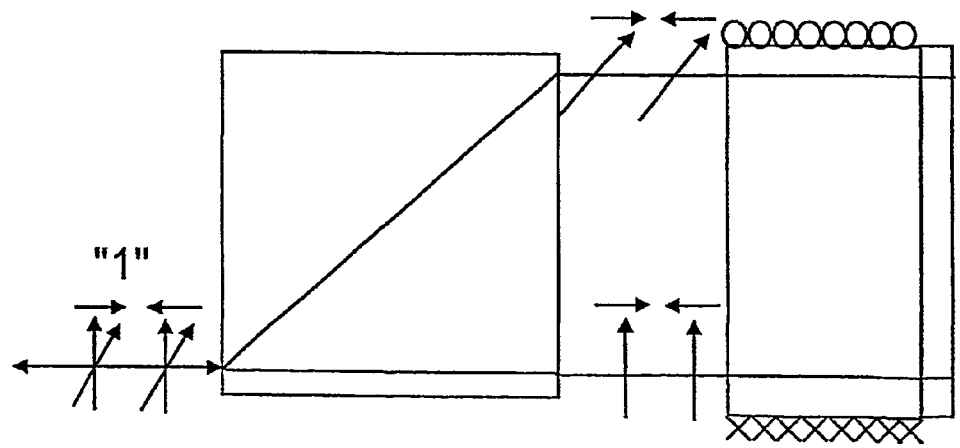

FIGS. 5a and 5b show operational states of the modulator 410 of FIG. 4. In both of these states, CW light is supplied by a laser located at the hub 112 and enters the modulator 410. The light enters the input/output 412 and is divided according to its polarisation by the polarisation divider 414. Light of one polarisation travels along the light path 416 and light of an orthogonal polarisation travels along the light path 418. The two light components travel along the coupling paths 424 and 426 and then enter through a front face 432 of the Faraday material. A mirror 434 is located at a rear face 436 of the Faraday material 428 opposite to the front face 432. The two light components pass through the Faraday material 428 and then are reflected by the mirror 434 and pass back through the Faraday material 428. The state of the light produced by the modulator 410 depends on whether the Faraday material 428 is energised by the coil 430 as will now be explained.

Referring now to FIG. 5a, if the modulating power source 422 is not applying a driving current to the coil 430, no magnetic field is produced and no Faraday rotation is applied to the light passing through the Faraday material 428. In this case, the light components leaving the Faraday material 428 return to the polarisation divider 414 having planes of polarisation which are appropriate to allow them to travel along light paths 416 and 418. Therefore, the light components are able to travel along the light paths 416 and 418 and are thus recombined at the input/output 412 so that they are output by the modulator 410. In this case, the modulator 410 produces a "1" signal.

Referring now to FIG. 5b, the modulating power source is applying a driving current to the coil 430 and a magnetic flux density B is generated which extends into the Faraday material 428. Accordingly, the light components have their planes of polarisation rotated as they pass through the Faraday material 428. It is arranged so that the length of the Faraday material, its Verdet constant, V and the magnetic flux density B are such that the planes of polarisations of the light components each undergo a rotation of 45° as they pass through the Faraday material 428. In this way, there are two passes, and thus the planes of polarisation are rotated by a total of 90°. In this case the light components return to the polarisation divider 414 and attempt to travel along light paths 416 and 418 which each previously allowed the transmission of a light component having an orthogonal polarisation with respect to the returned light components. Therefore, the light components cannot travel along the light paths 416 and 418 and thus the light components are either stopped or are refracted away from the input/output 412 so that they are not output by the modulator 410. In this case, no (or at least very little) light is produced by the modulator 410 and thus a "0" signal is produced.

Of course, the modulator can be arranged so that it produces a "0" signal when there is no power from the modulating power source 422, and a "1" signal when there is power from the modulating power source 422.

It should be noted that in the loop embodiment of FIG. 2, a "0" signal is produced when the Faraday material 228 is not energised and a "1" signal is produced when the Faraday material 228 is energised whereas in the mirror embodiment of FIG. 4, a "1" signal is produced when the Faraday material 428 is not energised and a "0" signal is produced when the Faraday material 428 is energised.

It will be understood by those skilled in the art that, for each modulator, a lens is used to couple the light from its transmission medium, typically an optical fibre, to the input/output.

Although it is possible that the planes of polarisation of light travelling in the modulators may be unintentionally rotated, for example while light components are travelling in the polarisation dividers, along the coupling paths or reflected by the mirror in the mirror embodiment, this can be compensated for by defining power settings of the modulating power control which provide maximum and minimum attenuation of the light and using these power settings for modulating "1" and "0" signals respectively. Of course, the power settings for modulating "1" and "0" signals can be set so that they provide other than maximum and minimum attenuation.

In order to provide a compact size, these modulators are fabricated as integrated optical circuits. Of course, it is not essential for all of the modulator to be fabricated on an integrated optical circuit and certain parts, such as the lenses, may be provided as bulk optics. In this case, various of the elements such as the polarisation dividers and the Faraday material in the Faraday rotators may be provided with anti-reflection coatings to minimise back reflection. Other parts, such as the coil, may be fabricated separately.

These modulators can be fabricated to have an insertion loss of less than 1 dB and possibly as low as 0.5 dB.

A significant advantage of these modulators is that they can be driven at high rates, such as 100 Mbit/s or even in the region of 1 Gbit/s. In order to provide very high rates, rather than using a single multi-coil, in another embodiment, a number of separate coils having a single turn or a small number of turns is used. In this way, the modulating power source drives a number of coils having small inductances rather than a single multi-turn coil having a relatively large inductance.

Although digital modulators have been described, in another embodiment of the invention the modulators can be used to provide analogue modulation. Since the amount of light extinction provided by the modulators depends on the amount of rotation imparted to the light components, which is, in turn, dependent on the current flowing in the coils, then analogue signals can be provided by controlling the amount of driving current provided by the modulating power supplies. Intermediate polarisation rotation may be provided in order to provide intermediate signal states between "0" and "1", for example for analogue signals, because the polarisation state depends linearly on the magnetic field and thus linearly on the driving current.

An advantage of the mirror embodiment over the loop embodiment is that the rotation efficiency is double because the light goes twice through the Faraday rotator 420. This means that in the mirror embodiment the thickness of the Faraday material 428 or value of the magnetic flux density B needs to be only half of the equivalent amount necessary in the loop embodiment.

In each of the embodiments, the polarisation divider enables the modulator to modulate light having a randomly orientated plane of polarisation.

Particular implementations and embodiments of the invention have been described. For example, rather than using a broadband light source in the users or ONUs, wavelength stabilized lasers may be used. Rather than using a CW light source, a non-CW light source may also be used such as a very fast modulated transmitter or a pulse source.

It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

What is claimed is:

1. A modulator comprising
    an input to receive light from a light source and modulate data onto it,
    a polarization divider to convert the light into plane-polarized light,
    a material which upon being energized rotates the plane of polarization of the plane-polarized light as it passes through the material such that energizing and de-energizing the material modulates data onto the light, and
    an output wherein the light travels through the material in opposite directions on a common path.

2. A modulator according to claim 1 in which the intensity of the light is modulated by changing its polarization state.

3. A modulator according to claim 1 in which the light is divided into two components having different respective polarization states.

4. A modulator according to claim 3 in which the polarization state of each of the light components is changed after the light is divided.

5. A modulator according to claim 1 in which the input and the output commonly comprise an input/output.

6. A modulator according to claim 1 in which the material is energized when subjected to a magnetic field.

7. A modulator according to claim 1 in which the material is a Faraday material.

8. A modulator according to claim 1 in which the material is energized when subjected to an electric field.

9. A modulator according to claim 8 which comprises a Pockels cell.

10. A modulator according to claim 1 which comprises a magnetic field generator for applying a magnetic field to the material.

11. A modulator according to claim 10 in which the magnetic field generator is a coil and a power supply for causing current flow in the coil.

12. A modulator according to claim 11 which comprises a modulation control unit for controlling the power supply.

13. A modulator according to claim 1 in which there are two common paths.

14. A modulator according to claim 13 in which the light is split into a first part and a second part wherein the first part travels on a first common path firstly in a first direction and then secondly in a second opposite direction and the second part travels on a second common path firstly in a first direction and then secondly in a second opposite direction.

15. A modulator according to claim 13 which comprises a reflecting element.

16. A modulator according to claim 1 in which the light passes once through the material.

17. A modulator according to claim 1 in which the light is split into a first part and a second part wherein the first part travels on the common path in a first direction and the second part travels on the common path in a second opposite direction.

18. A modulator according to claim 1 which produces "0" and "1" signals according to whether the material is energized.

19. A modulator according to claim 1 which produces analog signals according to whether the material is energized.

20. An optical network unit for an optical transmission system comprising a modulator, wherein the modulator comprises
   an input to receive light from a light source and modulate data onto it,
   a polarization divider to convert the light into plane-polarized light,
   a material which upon being energized rotates the plane of polarization of the plane-polarized light as it passes through the material such that de-energizing and energizing the material modulates data onto the light, and
   an output wherein the light travels through the material in opposite directions on a common path.

21. An optical transmission system comprising at least one modulator, wherein the at least one modulator comprises
   an input to receive light from a light source and modulate data onto it,
   a polarization divider to convert the light into plane-polarized light,
   a material which upon being energized rotates the plane of polarization of the plane-polarized light as it passes through the material such that energizing and de-energizing the material modulates data onto the light, and
   an output wherein the light travels through the material in opposite directions on a common path.

22. A method of modulating light comprising the steps of:
   receiving light from a light source;
   using a polarization divider to convert the light into plane-polarized light;
   sending the light in opposite directions on a common path through an energizable material; and
   energizing the material to rotate the plane of polarization of the plane-polarized light as it travels on the common path such that energizing and de-energizing the material modulates data onto the light.

* * * * *